US010686550B2

(12) United States Patent
Futagi et al.

(10) Patent No.: US 10,686,550 B2
(45) Date of Patent: Jun. 16, 2020

(54) RADIO TRANSMISSION DEVICE AND METHOD

(71) Applicant: Godo Kaisha IP Bridge 1, Tokyo (JP)

(72) Inventors: Sadaki Futagi, Ishikawa (JP); Daichi Imamura, Beijing (CN); Seigo Nakao, Kanagawa (JP); Tomofumi Takata, Ishikawa (JP)

(73) Assignee: Godo Kaisha IP Bridge 1, Tokyo (JP)

( * ) Notice: Subject to any disclaimer, the term of this patent is extended or adjusted under 35 U.S.C. 154(b) by 0 days.

(21) Appl. No.: 16/254,274

(22) Filed: Jan. 22, 2019

(65) Prior Publication Data

US 2019/0158213 A1 May 23, 2019

Related U.S. Application Data

(63) Continuation of application No. 15/689,503, filed on Aug. 29, 2017, now Pat. No. 10,225,042, which is a
(Continued)

(30) Foreign Application Priority Data

Jan. 4, 2008 (JP) .................................. 2008-000199

(51) Int. Cl.
*H04L 1/00* (2006.01)
*H04L 5/00* (2006.01)
(Continued)

(52) U.S. Cl.
CPC ............ *H04L 1/0004* (2013.01); *H04L 1/001* (2013.01); *H04L 1/0005* (2013.01);
(Continued)

(58) Field of Classification Search
None
See application file for complete search history.

(56) References Cited

U.S. PATENT DOCUMENTS 7,778,217 B2 * 8/2010 Lee ...................... H04W 52/281
370/318
8,098,759 B2 1/2012 Futagi et al.
(Continued)

FOREIGN PATENT DOCUMENTS

EP 1 914 948 A1 4/2008
JP 2003-283471 A 10/2003
(Continued)

OTHER PUBLICATIONS

"3rd Generation Partnership Project; Technical Specification Group Radio Access Network; Evolved Universal Radio Access (E-UTRA); Multiplexing and channel coding (Release 8)," Technical Specification, 3GPP TS 36.212 V8.0.0, Sep. 2007, 30 pages.
(Continued)

*Primary Examiner* — Hong S Cho
(74) *Attorney, Agent, or Firm* — Seed IP Law Group LLP

(57) ABSTRACT

A radio transmitting device and method enables reduction of an increase of CGI memories for the control channel and an improvement of the throughput of the data channel. When multiplex transmission through the control channel and the data channel is carried out and when adaptive modulation is applied to both channels, an MCS selecting section is provided with one CQI table for the data channel and CQI tables for the control channel, and a table selecting MCS determining section selects one of the tables depending on the transmission bandwidth of the terminal and determines the MCS of the control channel while looking up the selected CQI table.

18 Claims, 12 Drawing Sheets

Related U.S. Application Data continuation of application No. 15/258,739, filed on Sep. 7, 2016, now Pat. No. 9,787,427, which is a continuation of application No. 14/509,955, filed on Oct. 8, 2014, now Pat. No. 9,467,248, which is a continuation of application No. 13/686,598, filed on Nov. 27, 2012, now Pat. No. 8,897,389, which is a continuation of application No. 13/325,969, filed on Dec. 14, 2011, now Pat. No. 8,340,212, which is a continuation of application No. 12/811,509, filed as application No. PCT/JP2008/004009 on Dec. 26, 2008, now Pat. No. 8,098,759.

(51) Int. Cl.
  *H04W 72/04* (2009.01)
  *H04W 28/18* (2009.01)
  *H04W 88/02* (2009.01)

(52) U.S. Cl.
  CPC .......... *H04L 1/0011* (2013.01); *H04L 1/0013* (2013.01); *H04L 1/0016* (2013.01); *H04L 1/0021* (2013.01); *H04L 1/0035* (2013.01); *H04L 5/0055* (2013.01); *H04L 5/0057* (2013.01); *H04W 72/0413* (2013.01); *H04L 1/0026* (2013.01); *H04W 28/18* (2013.01); *H04W 72/04* (2013.01); *H04W 88/02* (2013.01); *Y02D 50/10* (2018.01)

(56) References Cited

U.S. PATENT DOCUMENTS

| | | | |
|---|---|---|---|
| 8,340,212 B2 | 12/2012 | Futagi et al. | |
| 8,812,048 B2* | 8/2014 | Shin | H04W 52/08 455/522 |
| 9,036,516 B2* | 5/2015 | Kent | H04W 24/10 370/310 |
| 2004/0196801 A1* | 10/2004 | Hiramatsu | H04L 1/0003 370/328 |
| 2005/0105483 A1 | 5/2005 | Uehara et al. | |
| 2006/0007887 A1* | 1/2006 | Kwon | H04L 1/1867 370/329 |
| 2006/0093024 A1 | 5/2006 | Pietraski et al. | |
| 2006/0251180 A1* | 11/2006 | Baum | H04L 1/0003 375/260 |
| 2007/0082619 A1* | 4/2007 | Zhang | H04W 52/143 455/69 |
| 2008/0132172 A1* | 6/2008 | Yoshii | H04L 1/0003 455/67.11 |
| 2008/0153425 A1 | 6/2008 | Heo et al. | |
| 2008/0188184 A1 | 8/2008 | Nogami et al. | |
| 2008/0233964 A1 | 9/2008 | McCoy et al. | |
| 2008/0268862 A1* | 10/2008 | Kent | H04B 7/0632 455/452.2 |
| 2009/0010211 A1 | 1/2009 | Sumasu et al. | |
| 2009/0059844 A1 | 3/2009 | Ko et al. | |
| 2009/0073940 A1* | 3/2009 | Shrivastava | H04L 1/0015 370/336 |
| 2009/0109999 A1 | 4/2009 | Kuri et al. | |
| 2009/0185638 A1 | 7/2009 | Imamura et al. | |
| 2009/0213955 A1 | 8/2009 | Higuchi et al. | |
| 2009/0232101 A1 | 9/2009 | Papasakellariou et al. | |
| 2009/0290541 A1 | 11/2009 | Nishio | |
| 2010/0027450 A1 | 2/2010 | Montojo et al. | |
| 2010/0103899 A1 | 4/2010 | Kwak et al. | |

FOREIGN PATENT DOCUMENTS

| | | |
|---|---|---|
| JP | 2006-211017 A | 8/2006 |
| JP | 2007-150906 A | 6/2007 |
| KR | 10-2007-0000807 A | 1/2007 |
| WO | 2006/052448 A2 | 5/2006 |
| WO | 2006/059565 A1 | 6/2006 |
| WO | 2006/082761 A1 | 8/2006 |
| WO | 2006/098105 A1 | 9/2006 |
| WO | 2006/106613 A1 | 10/2006 |
| WO | 2007/020996 A1 | 2/2007 |
| WO | 2007/037412 A1 | 4/2007 |
| WO | 2007/136002 A1 | 11/2007 |
| WO | 2008/078733 A1 | 7/2008 |

OTHER PUBLICATIONS

Ad hoc chairman, "Notes from uplink control signaling discussion," R1-073842, Agenda Item: 7.2.2, TSG-RAN WG1 #50, Athens, Greece, Aug. 20-24, 2007, 3 pages.

Change Request, "RM1 transparent for HS-SCCH-less operation," R1-073344, 3GPP TSG-RAN WG1 #50, Athens, Greece, Aug. 20-24, 2007, 3 pages.

Freescale Semiconductor, "Data Puncturing and Piggy-backed Control," R1-071727, Agenda Item: 7.11.1, 3GPP TSG-RAN1 #48bis, St. Julians, Malta, Mar. 26-30, 2007, 3 pages.

International Search Report, dated Apr. 7, 2009, for International Application No. PCT/JP2008/004009, 4 pages.

Motorola, "Multiplexing of Uplink Control Signaling with Data," R1-070777, Agenda Item: 6.9.1, 3GPP TSG RAN1 #48, St. Louis, USA, Feb. 12-16, 2007, 3 pages.

Motorola, "UL L1/L2 Control Signals with Data: Multiplexing Detail," R1-073388, Agenda Item: 7.2.4, 3GPP TSG RAN1 #50, Athens, Greece, Aug. 20-24, 2007, 3 pages.

Search Report, dated Sep. 13, 2013, for corresponding Chinese Application No. 2008801215677, 3 pages.

Qualcomm Europe, "Rate matching details for control and data multiplexing," R1-073269, Agenda Item: 7.3, An5xter73GPP TSG-RAN WG1 #50, Athens, Greece, Aug. 20-24, 2007, 6 pages.

Nokia, "Update to 64QAM CQI tables," R1-073334, Agenda Item: 6, 3GPP TSG-RAN WG1 Meeting #50, Athens, Greece, Aug. 20-24, 2007, 2 pages.

* cited by examiner

| CQI VALUE | NUMBER OF HS-PDSCH | MODULATION SCHEME | OLD TBS | NEW TBS | DIFFERENCE | OLD CODING RATE | NEW CODING RATE | DIFFERENCE |
|---|---|---|---|---|---|---|---|---|
| 0 | | | | | | | | |
| 1 | 1 | QPSK | 137 | 136 | -1 | 0.143 | 0.142 | -0.001 |
| 2 | 1 | QPSK | 173 | 176 | 3 | 0.180 | 0.183 | 0.003 |
| 3 | 1 | QPSK | 233 | 232 | -1 | 0.243 | 0.242 | -0.001 |
| 4 | 1 | QPSK | 317 | 320 | 3 | 0.330 | 0.333 | 0.003 |
| 5 | 1 | QPSK | 377 | 376 | -1 | 0.393 | 0.392 | -0.001 |
| 6 | 1 | QPSK | 461 | 464 | 3 | 0.480 | 0.483 | 0.003 |
| 7 | 2 | QPSK | 650 | 648 | -2 | 0.339 | 0.338 | -0.001 |
| 8 | 2 | QPSK | 792 | 792 | 0 | 0.413 | 0.413 | 0.000 |
| 9 | 2 | QPSK | 931 | 928 | -3 | 0.485 | 0.483 | -0.002 |
| 10 | 3 | QPSK | 1262 | 1264 | 2 | 0.438 | 0.439 | 0.001 |
| 11 | 3 | QPSK | 1483 | 1488 | 5 | 0.515 | 0.517 | 0.002 |
| 12 | 3 | QPSK | 1742 | 1744 | 2 | 0.605 | 0.606 | 0.001 |
| 13 | 4 | QPSK | 2279 | 2288 | 9 | 0.593 | 0.596 | 0.002 |
| 14 | 4 | QPSK | 2583 | 2592 | 9 | 0.673 | 0.675 | 0.002 |
| 15 | 5 | QPSK | 3319 | 3328 | 9 | 0.691 | 0.693 | 0.002 |
| 16 | 5 | 16-QAM | 3565 | 3576 | 11 | 0.371 | 0.373 | 0.001 |
| 17 | 5 | 16-QAM | 4189 | 4200 | 11 | 0.436 | 0.438 | 0.001 |
| 18 | 5 | 16-QAM | 4664 | 4672 | 8 | 0.486 | 0.487 | 0.001 |
| 19 | 5 | 16-QAM | 5287 | 5296 | 9 | 0.551 | 0.552 | 0.001 |
| 20 | 5 | 16-QAM | 5887 | 5896 | 9 | 0.613 | 0.614 | 0.001 |
| 21 | 5 | 16-QAM | 6554 | 6568 | 14 | 0.683 | 0.684 | 0.001 |
| 22 | 5 | 16-QAM | 7168 | 7184 | 16 | 0.747 | 0.748 | 0.002 |
| 23 | 7 | 16-QAM | 9719 | 9736 | 17 | 0.723 | 0.724 | 0.001 |
| 24 | 8 | 16-QAM | 11418 | 11432 | 14 | 0.743 | 0.744 | 0.001 |
| 25 | 10 | 16-QAM | 14411 | 14424 | 13 | 0.751 | 0.751 | 0.001 |
| 26 | 10 | 16-QAM | 15761 | 15776 | 15 | 0.547 | 0.548 | 0.001 |
| 27 | 12 | 64-QAM | 21754 | 21768 | 14 | 0.629 | 0.630 | 0.001 |
| 28 | 13 | 64-QAM | 26490 | 26504 | 14 | 0.708 | 0.708 | 0.000 |
| 29 | 14 | 64-QAM | 32257 | 32264 | 7 | 0.800 | 0.800 | 0.000 |
| 30 | 15 | 64-QAM | 38582 | 38576 | -6 | 0.893 | 0.893 | 0.000 |

FIG.1

| CQI | SNR[dB] | SE(DATA) | SE(CONTROL) |
|---|---|---|---|
| 0 | -10 | 0.079 | 0.01 |
| 1 | -9 | 0.100 | 0.02 |
| 2 | -8 | 0.126 | 0.03 |
| 3 | -7 | 0.158 | 0.04 |
| 4 | -6 | 0.200 | 0.05 |
| 5 | -5 | 0.251 | 0.06 |
| 6 | -4 | 0.316 | 0.07 |
| 7 | -3 | 0.398 | 0.08 |
| 8 | -2 | 0.500 | 0.09 |
| 9 | -1 | 0.645 | 0.1 |
| 10 | 0 | 0.784 | 0.11 |
| 11 | 1 | 0.934 | 0.12 |
| 12 | 2 | 1.097 | 0.13 |
| 13 | 3 | 1.254 | 0.14 |
| 14 | 4 | 1.318 | 0.15 |
| 15 | 5 | 1.559 | 0.16 |
| 16 | 6 | 1.799 | 0.17 |
| 17 | 7 | 2.051 | 0.18 |
| 18 | 8 | 2.298 | 0.19 |
| 19 | 9 | 2.549 | 0.2 |
| 20 | 10 | 2.831 | 0.21 |
| 21 | 11 | 3.113 | 0.22 |
| 22 | 12 | 3.241 | 0.23 |
| 23 | 13 | 3.550 | 0.24 |
| 24 | 14 | 3.871 | 0.25 |
| 25 | 15 | 4.207 | 0.26 |
| 26 | 16 | 4.546 | 0.27 |
| 27 | 17 | 4.887 | 0.28 |
| 28 | 18 | 5.179 | 0.29 |
| 29 | 19 | 5.418 | 0.3 |
| 30 | 20 | 5.525 | 0.31 |

FIG.2

| CQI | TABLE 1 | TABLE 2 |
|---|---|---|
| 0 | 0.01 | 0.1 |
| 1 | 0.02 | 0.11 |
| 2 | 0.03 | 0.12 |
| 3 | 0.04 | 0.13 |
| 4 | 0.05 | 0.14 |
| 5 | 0.06 | 0.15 |
| 6 | 0.07 | 0.16 |
| 7 | 0.08 | 0.17 |
| 8 | 0.09 | 0.18 |
| 9 | 0.1 | 0.19 |
| 10 | 0.11 | 0.2 |
| 11 | 0.12 | 0.21 |
| 12 | 0.13 | 0.22 |
| 13 | 0.14 | 0.23 |
| 14 | 0.15 | 0.24 |
| 15 | 0.16 | 0.25 |
| 16 | 0.17 | 0.26 |
| 17 | 0.18 | 0.27 |
| 18 | 0.19 | 0.28 |
| 19 | 0.2 | 0.29 |
| 20 | 0.21 | 0.3 |
| 21 | 0.22 | 0.31 |
| 22 | 0.23 | 0.32 |
| 23 | 0.24 | 0.33 |
| 24 | 0.25 | 0.34 |
| 25 | 0.26 | 0.35 |
| 26 | 0.27 | 0.36 |
| 27 | 0.28 | 0.37 |
| 28 | 0.29 | 0.38 |
| 29 | 0.3 | 0.39 |
| 30 | 0.31 | 0.4 |

FIG.8

| CQI | TABLE 1 | TABLE 2 | TABLE 3 | TABLE 4 |
|---|---|---|---|---|
| | BANDWIDTH (UP TO 500 kHz) | BANDWIDTH (UP TO 500 kHz) | BANDWIDTH (MORE THAN 500 kHz) | BANDWIDTH (MORE THAN 500 kHz) |
| | PERSISTENT SCHEDULING | DYNAMIC SCHEDULING | PERSISTENT SCHEDULING | DYNAMIC SCHEDULING |

FIG.9

| CONDITION | OFFSET |
|---|---|
| DYNAMIC SCHEDULING | 0 |
| PERSISTENT SCHEDULING | 2 |
| WITH FREQUENCY HOPPING | 0 |
| WITHOUT FREQUENCY HOPPING, 1 RB | −4 |
| WITHOUT FREQUENCY HOPPING, 2 RBS | −3 |
| WITHOUT FREQUENCY HOPPING, 3 RBS | −2 |
| WITHOUT FREQUENCY HOPPING, 4 RBS | −1 |
| WITHOUT FREQUENCY HOPPING, 5 RBS OR MORE | 0 |
| FIRST TRANSMISSION | 0 |
| RETRANSMISSION | −2 |

FIG.11

| CQI | SE |
|---|---|
| −10 | 0.01 |
| −9 | 0.02 |
| −8 | 0.03 |
| −7 | 0.04 |
| −6 | 0.05 |
| −5 | 0.06 |
| −4 | 0.07 |
| −3 | 0.08 |
| −2 | 0.09 |
| −1 | 0.1 |
| 0 | 0.11 |
| 1 | 0.12 |
| 2 | 0.13 |
| 3 | 0.14 |
| 4 | 0.15 |
| 5 | 0.16 |
| · | · |
| · | · |
| 25 | 0.3 |
| 26 | 0.31 |
| 27 | 0.32 |
| 28 | 0.33 |
| 29 | 0.34 |
| 30 | 0.35 |
| 31 | 0.36 |
| 32 | 0.37 |
| 33 | 0.38 |
| 34 | 0.39 |
| 35 | 0.4 |
| 36 | 0.41 |
| 37 | 0.42 |

LOW SE TABLE (WHEN OFFSET IS NEGATIVE)

LOOKUP TABLE

HIGH SE TABLE (WHEN OFFSET SHOWS IS POSITIVE)

FIG.12

| CQI | SE |
|---|---|
| −10 | 0.01 |
| −9 | 0.02 |
| −8 | 0.03 |
| −7 | 0.04 |
| −6 | 0.05 |
| −5 | 0.06 |
| −4 | 0.07 |
| −3 | 0.08 |
| −2 | 0.09 |
| −1 | 0.1 |
| 0 | 0.11 |
| 1 | 0.12 |
| 2 | 0.13 |
| 3 | 0.14 |
| 4 | 0.15 |
| 5 | 0.16 |
| . | . |
| . | . |
| 25 | 0.3 |
| 26 | 0.31 |
| 27 | 0.32 |
| 28 | 0.33 |
| 29 | 0.34 |
| 30 | 0.35 |
| 31 | 0.36 |
| 32 | 0.37 |
| 33 | 0.38 |
| 34 | 0.39 |
| 35 | 0.4 |
| 36 | 0.41 |
| 37 | 0.42 |

RANGE OF 0.7 TIMES OF (LOOKUP TABLE + OFFSET)

RANGE OF 1.3 TIMES OF (LOOKUP TABLE + OFFSET)

FIG.14

RADIO TRANSMISSION DEVICE AND METHOD

TECHNICAL FIELD

The present disclosure relates to a radio transmitting apparatus and a radio transmission method that are used in communication systems employing an adaptive modulation.

RELATED ART

Presently, in 3GPP RAN LTE (Long Term Evolution) in uplink, single carrier transmission is gaining attention to achieve a low PAPR (Peak to Average Power Ratio). Further, studies are conducted for a scheme to perform "adaptive modulation (AMC: Adaptive Modulation and Coding)" for selecting a user-specific MCS (Modulation and Coding Scheme) pattern according to a CQI (Channel Quality Indicator) of users to achieve high throughput.

Further, to adopt adaptive modulation and hybrid ARQ to a downlink data channel, in uplink channel, downlink CQI information and downlink ACK/NACK information are transmitted in a control channel.

FIG. 1 shows an MCS table a terminal uses for adaptive modulation for a data channel and so on (hereinafter, "CQI table") (see, for example, Non-Patent Document 1). Here shows, based on a CQI value, that is, based on channel quality information including an SNR, various modulation schemes and coding rates are read from the table shown in FIG. 1 to determine an MCS for a data channel.

Further, studies are underway to transmit an uplink data channel and an uplink control channel in the same frame, and, furthermore, to determine an MCS for the control channel at the same time as an MCS for the data channel, using a CQI determining the MCS for the data channel (see, for example, Non-Patent Document 2).

Accordingly, similar to the MCS for a control channel, various modulation schemes and coding rates (hereinafter SE: Spectral Efficiency, and SE is defined as the number of bits per symbol×coding rate) are determined in accordance with CQIs. FIG. 2 shows a concrete example of a CQI table in which associations between data channel SE and control channel SE are shown. Hybrid ARQ is not adopted to this control channel. Accordingly, control channel SE is set up robust with respect to CQIs that is, the SE is set up to be low such that required quality is satisfied even in a poor reception environment.

Non-Patent Document 1: R1-073334, Nokia, "Update to 64QAM CQI tables," 3GPP TSG RAN WG1 Meeting #50, Athens, Greece, Aug. 20-24, 2007
Non-Patent Document 2: 3GPP TS36.212 V8.0.0

BRIEF SUMMARY

However, with the above-described technique, in situations where the reception environment is not poor, SE read from the table fully satisfies required quality for a control channel, and therefore wasted radio resources are provided to use the control channel. As a result, there is a problem of decreasing data channel throughput.

This case will be explained as an example shown in FIG. 3. As shown in FIG. 3, when a data channel and a control channel are multiplexed and transmitted in the same frame, the size of resources that can be used is determined. When the reception environment is not poor, SE that fully satisfies the required quality for a control channel is set, and therefore control channel resources are wasted. However, these wasted resources cannot be used as data channel resources, and therefore data channel throughput decreases.

An embodiment provides a radio transmitting apparatus and a radio transmission method that facilitates improvement of data channel throughput.

The radio transmitting apparatus of an embodiment adopts the configuration including: a modulation and coding scheme selection section that switches associations between channel quality indicators and modulation and coding schemes according to a parameter of a radio communication terminal apparatus, to determine a modulation and coding scheme of a control channel based on the associations after the switching; and a coding and modulation section that encodes and modulates control data by the determined modulation and coding scheme.

The radio transmission method of an embodiment includes: a switching step of switching associations between channel quality indicators and modulation and coding schemes according to a parameter of radio communication terminal apparatus; a modulation and coding scheme selection step of determining a modulation and coding scheme of a control channel based on the associations after the switching; and a coding and modulation step of encoding and modulating control data by the determined modulation and coding scheme.

An embodiment provides an advantage of improving data channel throughput.

BRIEF DESCRIPTION OF DRAWINGS

FIG. 1 shows a CQI table a terminal uses for adaptive modulation of a data channel and so on;

FIG. 2 shows a concrete example of a CQI table showing associations between data channel SE and control channel SE;

FIG. 8 shows an example of a control channel CQI table;

FIG. 9 shows another example of a control channel CQI table;

FIG. 11 shows an example of an offset lookup table;

FIG. 12 shows an example of a control channel CQI table;

FIG. 14 shows a CQI table according to Embodiment 4 of the present disclosure.

DETAILED DESCRIPTION

Figure 3:
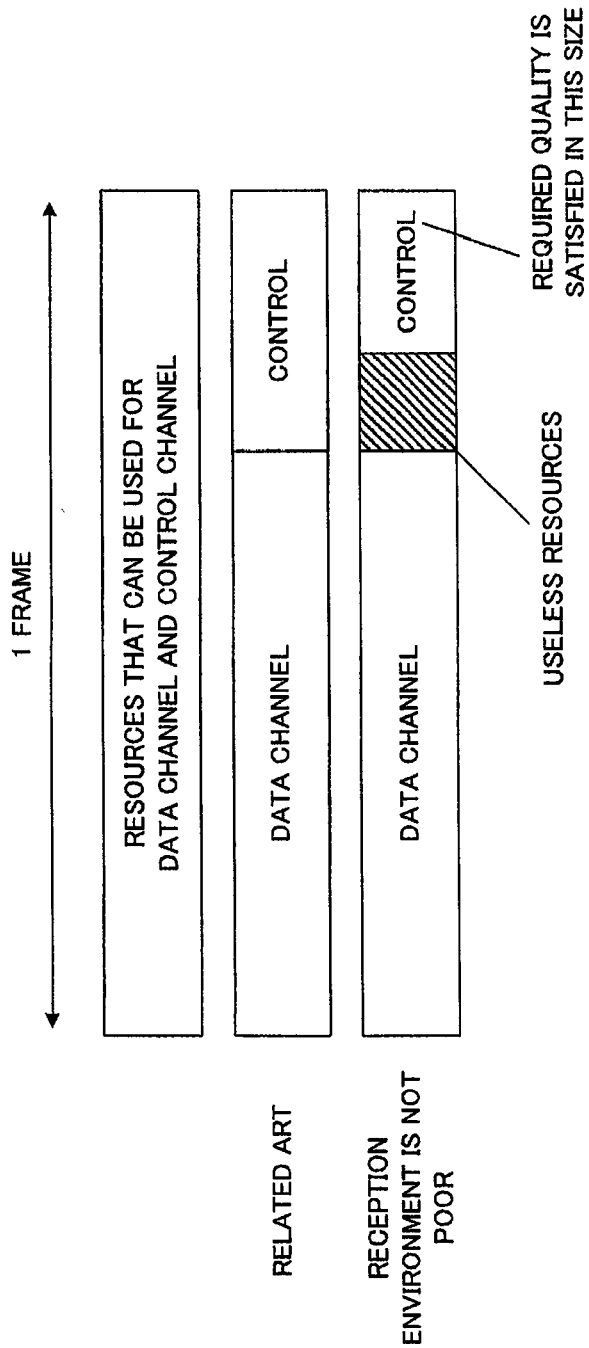
FIG. 3 illustrates how a data channel and a control channel are multiplexed and transmitted in the same frame.
Figure 4:
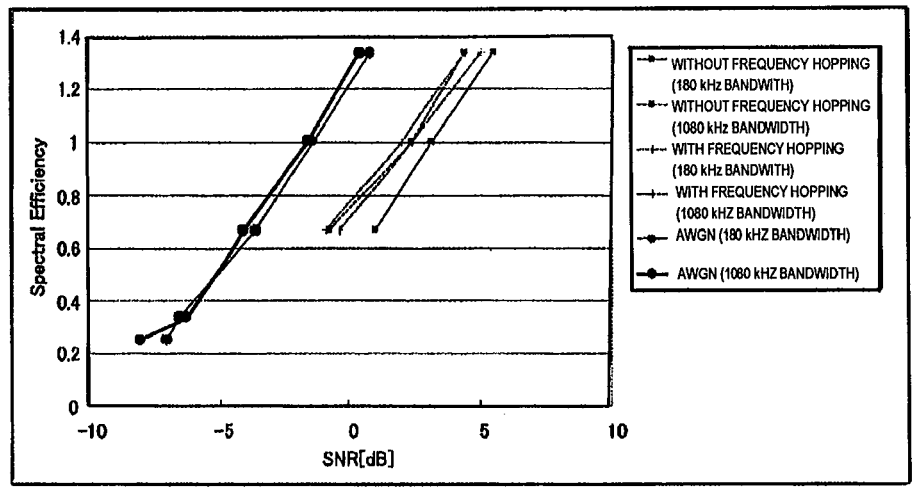
FIG. 4 shows the relationships between the received SNRs and the SE when required BLER of a data channel is 10%.
Figure 5:
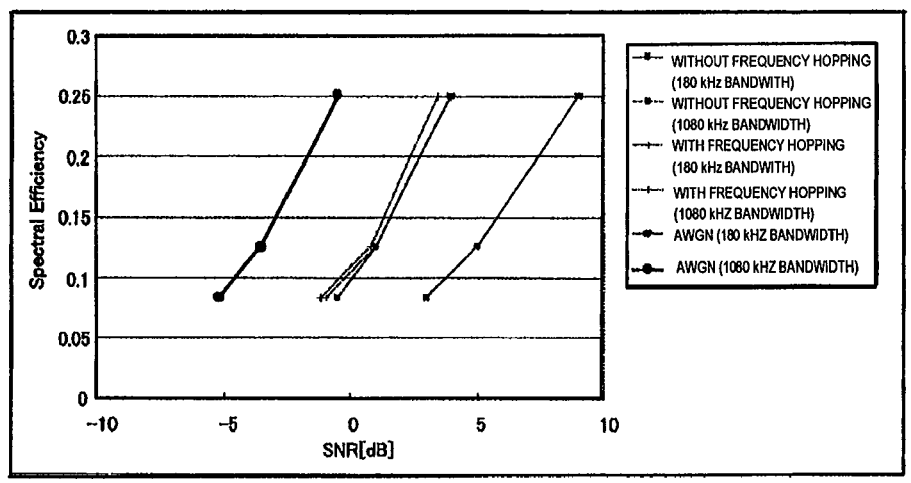
FIG. 5 shows the relationships between the received SNRs and the SE when required BER of ACK/NACK channels is 0.01%.

Now, embodiments of the present disclosure will be described in detail with reference to the accompanying drawings. FIG. 4 shows the relationships between the received SNRs and the SE (Spectral Efficiency) acquired from simulation results when required BLER of a data channel is 10%. Further, FIG. 5 shows the relationships between the received SNRs and the SE when required BER of ACK/NACK of control channels is 0.01%. According to the present embodiment, although the difference in a received SNR between performance with AWGN and SE without frequency hopping (a 180 kHz bandwidth) is 5 dB in a data channel, the difference is 9 dB in a control channel, and therefore the focus is placed upon severe deterioration of the control channel performance. That is, the focus is placed upon a significant difference between the data channel performance and the control channel performance in specific conditions.

Embodiment 1

Figure 6:
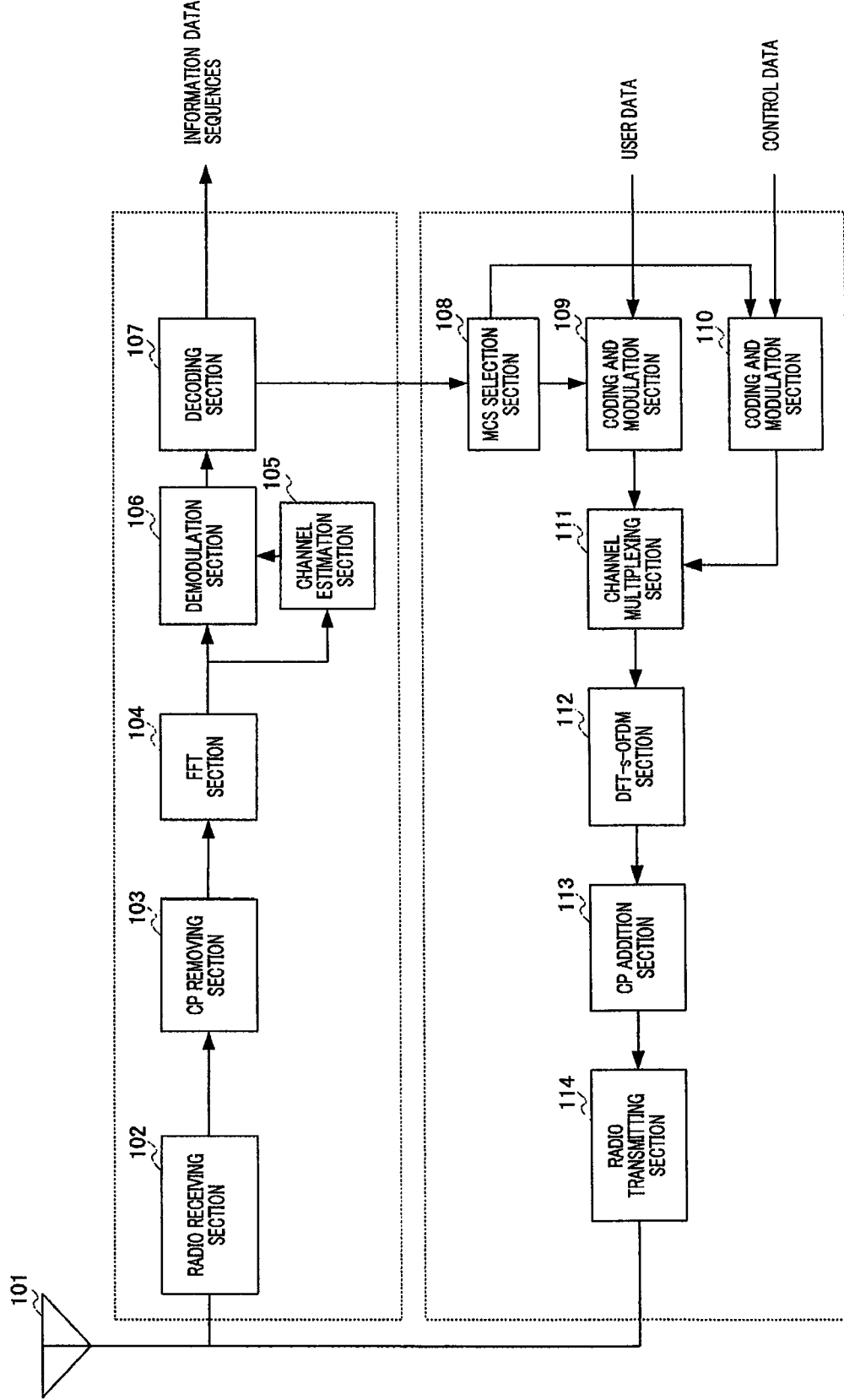
FIG. 6 is a block diagram showing the configuration of a radio communication terminal apparatus according to Embodiment 1 of the present disclosure.

FIG. 6 is block diagram showing the configuration of a radio communication terminal apparatus according to Embodiment 1 of the present disclosure. Now, the configuration of the radio communication terminal apparatus will be explained with reference to FIG. 6. Radio receiving section 102 converts a signal received via antenna 101 to a base band signal, and outputs the baseband signal to CP removing section 103.

CP removing section 103 removes the CP (Cyclic Prefix) from the baseband signal outputted from radio receiving section 102, and outputs the resulting signal to FFT section 104.

FFT section 104 performs an FFT (Fast Fourier Transform) on the time-domain signal outputted from CP removing section 103, and outputs the resulting frequency-domain signal to channel estimation section 105 and demodulation section 106.

Channel estimation section 105 estimates a channel environment of the received signal using the pilot signal included in the signal outputted from FFT section 104, and outputs the estimation result to demodulation section 106.

Based on the channel environment estimation result of the outputted from channel estimation section 105, demodulation section 106 performs channel compensation for a signal acquired by removing control information such as the pilot signal from the received signal outputted from FFT section 104, that is, performs channel compensation for data information. Further, demodulation section 106 demodulates the signal after the channel compensation based on the same MCS as the MCS used in the base station of the communicating party, and outputs the demodulated signal to decoding section 107.

Decoding section 107 performs error correction for the demodulated signal outputted from demodulation section 106, and extracts information data sequences, CQI information and bandwidth information from the received signal. The CQI information and the bandwidth information are outputted to MCS selection section 108.

MCS selection section 108 having a CQI table (described later) reads from the CQI table an MCS pattern associated with the CQI information outputted from decoding section 107, and determines the read MCS pattern as the MCS for a data channel (MCS 1). Further, based on the CQI information and the bandwidth information outputted from decoding section 107, MCS selection section 108 determines an MCS pattern for the control channel (MCS 2) with reference to a plurality of CQI tables (described later). The determined MCS 1 is outputted to coding and modulation section 109 and MCS 2 is outputted to coding and modulation section 110.

Coding and modulation section 109 encodes and modulates user data received as input (transmission data sequences) based on MCS 1 outputted from MCS selection section 108, to generate data channel transmission data. The generated transmission data for the data channel is outputted to channel multiplexing section 111.

Coding and modulation section 110 encodes and modulates control data received as input based on MCS 2 outputted from MCS selection section 108, to generate control channel transmission data. The generated transmission data for the control channel is outputted to channel multiplexing section 111.

Channel multiplexing section 111 performs time-division multiplexing of the transmission data for the data channel outputted from coding and modulation section 109 and the transmission data for the control channel outputted from coding and modulation section 110. The multiplexed transmission data is outputted to DFT-s-OFDM section 112.

DFT-s-OFDM section 112 performs a discrete Fourier transform (DFT) on the transmission data outputted from channel multiplexing section 111 and performs time-frequency transform on the data of frequency components, to acquire a frequency-domain signal. Then, after the frequency-domain signal is mapped to transmission subcarriers, the mapped frequency-domain signal is subject to an IFFT (Inverse Fast Fourier Transform) processing, to be transformed to a time-domain signal. The acquired time-domain signal is outputted to CP addition section 113.

CP addition section 113 adds CPs to the frames in the transmission data sequences outputted from DFT-s-OFDM section 112 by duplicating data at the tail of each frame and by adding the duplicated data to the beginning of each frame, and outputs the transmission data with CPs to radio transmitting section 114.

Radio transmitting section 114 frequency-converts the baseband signal outputted from CP addition section 113 to a radio frequency band signal, and transmits the converted signal via antenna 101.

Figure 7:
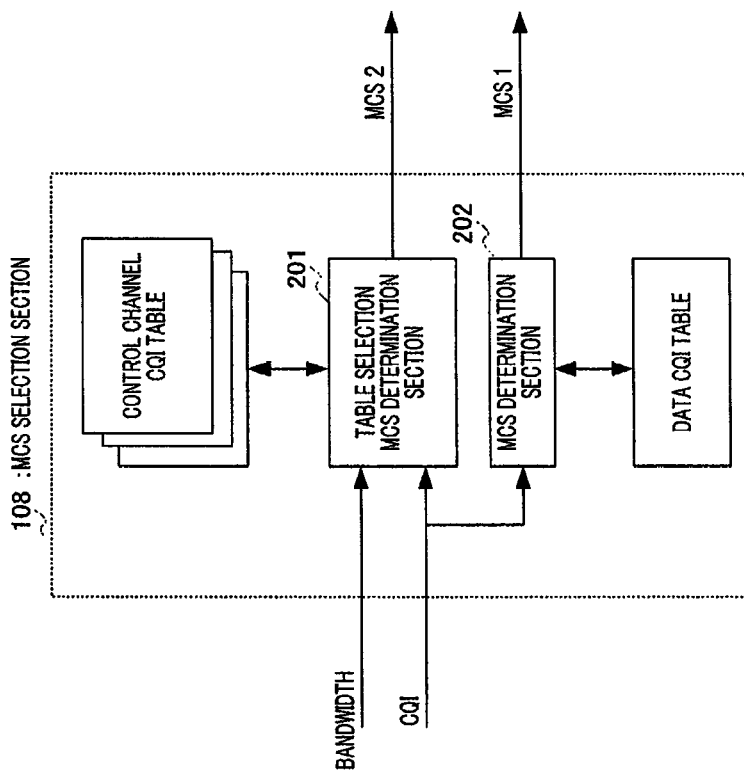
FIG. 7 is a block diagram showing an internal configuration of the MCS selection section shown in FIG. 6.

FIG. 7 is a block diagram showing an internal configuration of MCS selection section 108 shown in FIG. 6. Based on a CQI received as input, table selection MCS determination section 201 determines MCS 2 for the control channel with reference to the CQI table corresponding to the bandwidth among the control channel CQI tables shown in FIG. 8.

Based on a CQI received as input, MCS determination section 202 determines MCS 1 for the data channel with reference to the data CQI table.

FIG. 8 shows an example of a control channel CQI table. Here, table 1 is the CQI table for a 500 kHz bandwidth or below, and table 2 is the CQI table for more than a 500 kHz bandwidth. Further, with the same CQIs, SE in table 1 is set up lower than SE in table 2. When the bandwidth is narrow as 500 kHz, that is, when frequency diversity effect is small, lower SE is selected. On the other hand, when frequency diversity effect is significant, higher SE is selected than the SE in table 1. Accordingly, when the frequency diversity effect is significant, few control signal resources make it possible to satisfy the required quality for the control channel compared in a case where diversity effect is small, so that it is possible to increase the amount of resources used for the data channel.

In this way, according to Embodiment 1, when a data channel and a control channel are multiplexed and transmitted and adaptive modulation is applied to both channels, by providing one data channel CQI table and a plurality of control channel CQI tables, switching between a plurality of tables in accordance with a transmission bandwidth of a terminal, and determining the MCS for the control channel, it is possible to determine an MCS appropriate for the bandwidth and allocate radio resources used for the control channel adequately, thereby increasing radio resources used for the data channel. This makes it possible to improve data channel throughput.

Although a case has been explained with the present embodiment as an example where a CQI table is selected based only on the transmission bandwidth, as shown in FIG. 9, it is equally possible to select four CQI tables based on data channel scheduling methods in addition to a bandwidth. When persistent scheduling is used for a data channel, a low CQI is reported to make the MCS for the data channel robust. In this case, it is possible to increase the amount of resources used for the data channel by taking into account the difference in CQI between two kinds of scheduling, that is, normal scheduling (i.e. dynamic scheduling) and persistent scheduling, by configuring a plurality of control channel CQI tables and making the MCS and resources of use of the control channel adequate.

Embodiment 2

The configuration of a radio communication terminal apparatus according to Embodiment 2 of the present disclosure is the same as shown in FIG. 6 of Embodiment 1, this embodiment will be explained with reference to FIG. 6, and the overlapping explanation will be omitted.

Figure 10:
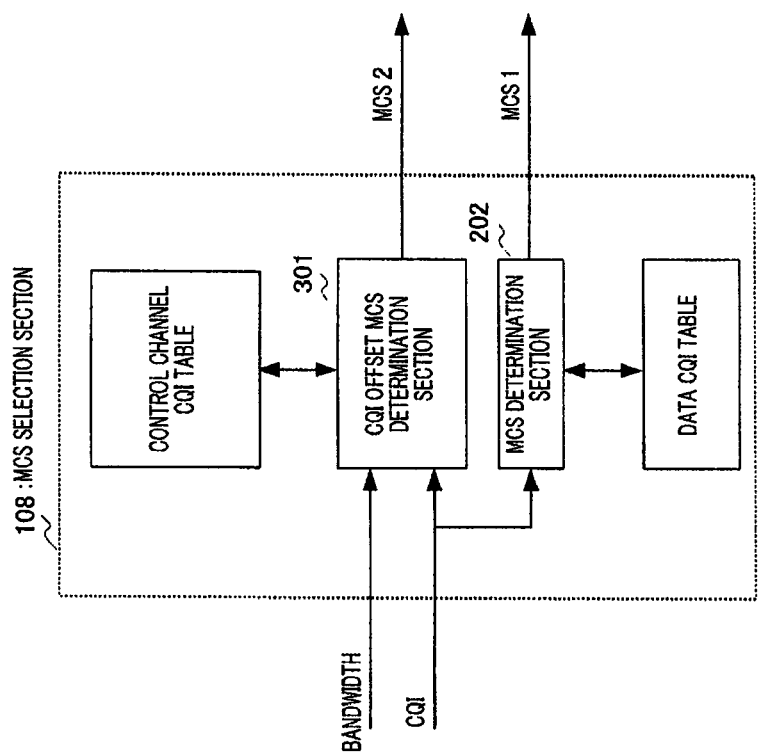
FIG. 10 shows a block diagram showing the internal configuration of the MCS selection section according to Embodiment 2 of the present disclosure.

FIG. 10 is a block diagram showing the internal configuration of MCS selection section 108 according to Embodiment 2 of the present disclosure. CQI offset MCS determination section 301 calculates a control channel CQI using an offset lookup table shown in FIG. 11, CQI information and equation 1.

Control channel CQI=CQI+Σoffset[condition]     (Equation 1)

Further, based on that control channel CQI, CQI offset MCS determination section 301 determines MCS 2 for the control channel with reference to the control channel CQI table shown in FIG. 12.

FIG. 11 shows an example of an offset lookup table. Here, when the data channel scheduling method is dynamic scheduling, the offset is zero, and when the data channel scheduling method is persistent scheduling, the offset is two. In this case, offsets are provided by taking into account of CQI differences between two kinds of scheduling, that is, between normal scheduling (i.e. dynamic scheduling) and persistent scheduling.

Further, the offset is zero when the data channel is used with frequency hopping, and the offset is −4 when the bandwidth is 1 RB (resource block) without frequency hopping. When frequency diversity effect is small, for example, frequency hopping is not adopted in a frame and transmission is performed in a narrow band, the offsets are provided so as to select a lower MCS. This is because the relatively small number of bits is transmitted and coding gain is less likely to be acquired. By taking into account of the above reason, offsets are provided according to bandwidths.

Furthermore, the offset is zero when a data channel transmission is the first, and the offset is −2 upon retransmissions. Received quality is poorer than expected when a data channel is retransmitted. In such a case, received quality may deteriorate with regards to a control channel, and therefore an offset is provided so as to select a lower MCS.

As explained above, according to parameters of a terminal, such as a data scheduling method, a bandwidth, frequency hopping in frames, and the number of data channel retransmissions, it is possible to set up a more adequate MCS. Accordingly, it is possible to satisfy required quality for a control channel using adequate control channel resources, so that the amount of resources used for a data channel can be increased.

FIG. 12 is an example of a control channel CQI table. Here, in addition to SE for 0 to 30 CQIs in a lookup table, lower SE for −1 to −10 CQIs and higher SE for 31 to 37 are newly set. Here, the lower SE part is mainly used when an offset is negative, and the higher SE part is mainly used when an offset is positive.

In this way, according to Embodiment 2, when a data channel and a control channel are multiplexed and transmitted and adaptive modulation is applied to both channels, one data channel CQI table, one control channel CQI table in series formed in a larger size than that data channel CQI table and an offset lookup table formed with parameters of a terminal are provided to determine the MCS for the control channel by a CQI found by adding all the amounts of offsets read from a offset lookup table to a data channel CQI, so that it is possible to prevent memory from increasing and improve data channel throughput.

Embodiment 3

Figure 13:
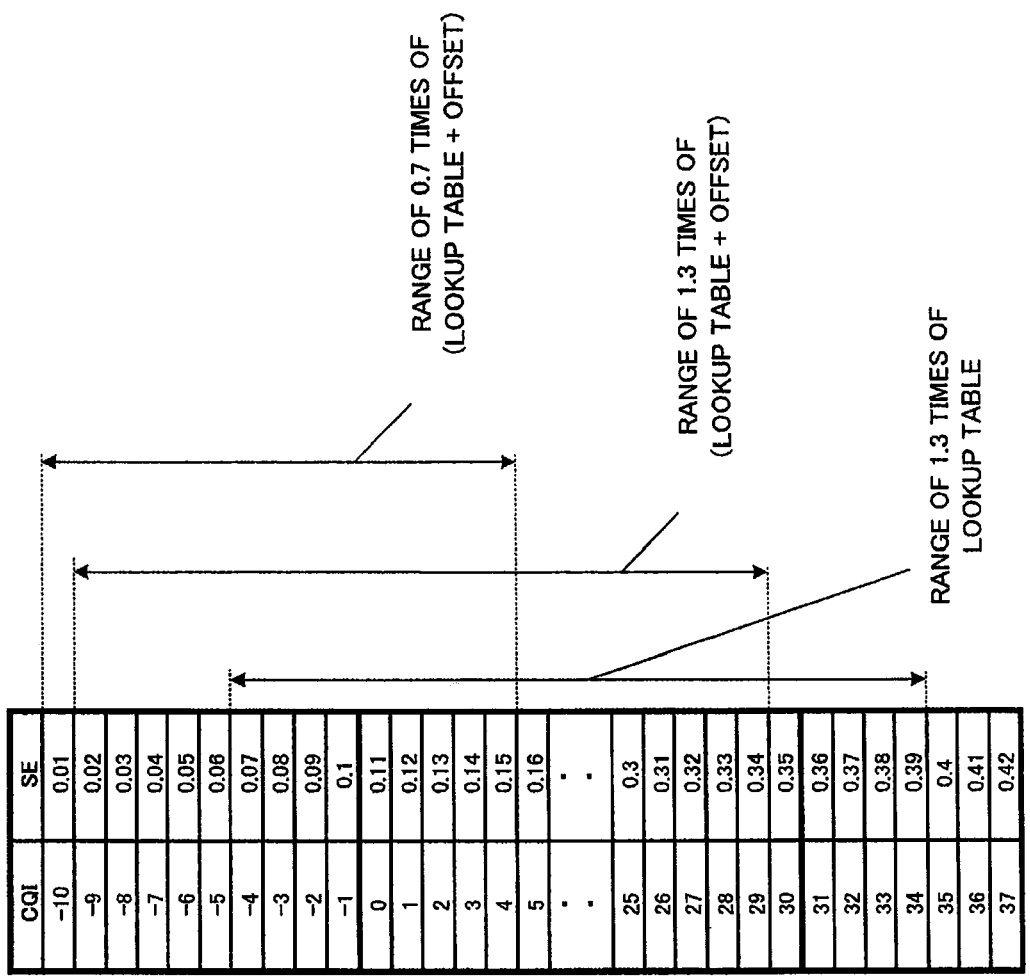
FIG. 13 shows a CQI table according to Embodiment 3 of the present disclosure.

FIG. 13 shows a CQI table according to Embodiment 3 of the present disclosure and by multiplying equation 1 by a scaling factor (N), a range set up in a lookup table can be bigger or smaller. A control channel CQI can be calculated using equation 2, Control channel CQI=floor($N$×(CQI+Σoffset[condition]))     (Equation 2)

where N is a decimal.

To apply a case where a coding scheme varies like between an uplink CQI channel and ACK/NACK channels used in LTE, by changing the value, N, a control channel is applicable to different coding schemes. That is, an uplink CQI channel is applicable by only changing offset and value N, and ACK/NACK channels are applicable by an offset (N=1) only, so that it is possible to refer to MCSs of two kinds of control channels from the same CQI table.

In this way, according to Embodiment 3, a scaling factor is multiplied by a control channel CQI that is found by adding all the amounts of offsets, to calculate the new control channel CQI and to determine the MCS for the control channel, so that it is possible to prevent memory from increasing and improve data channel throughput even when there are control channels of different coding schemes.

Embodiment 4

FIG. 14 shows a CQI table according to Embodiment 4 of the present disclosure. The CQI table is calculated using equation 2 shown in Embodiment 3, where N is a decimal and, N=N_A(CQI<CQI_TH) and N=N_B(CQI>CQI_TH). Specifically, FIG. 14 shows a case where CQI_TH=3, N_A=0.7 and N_B=1.3. In this way, by changing a scaling factor, N, according to the magnitude of a CQI, it is possible to determine the MCS more accurately.

In this way, according to Embodiment 4, by multiplying by a scaling factor a control channel CQI found by adding all the amounts of offsets, changing the scaling factor according to the magnitude of the CQI, calculating a control channel CQI and determining the MCS for the control channel, even when there are control channels of different coding schemes, it is possible to prevent memory from increasing, and, furthermore, improve data channel throughput.

Although cases have been explained with Embodiments 3 and 4 where a primary linear process of multiplying N is adopted, a higher linear process may be adopted.

With the above embodiments, "drop" may be included in a control channel CQI table not so as to transmit a control channel using the lowest SE (MCS).

Further, with the above embodiments, when a calculated control channel CQI is outside the range of the control channel CQI table, it is possible to use the SE (MCSs) at both ends of the CQI table or use extrapolation.

Further, although cases have been described with the above embodiments as examples where embodiments of the present disclosure is configured by hardware, embodiments of the present disclosure can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

INDUSTRIAL APPLICABILITY

The radio transmitting apparatus and radio transmission method according to at least one embodiment improves data channel throughput, and is applicable to, for example, mobile communication systems.

The invention claimed is:

1. A radio transmitting apparatus comprising:
a modulation and coding scheme selection section that switches associations between channel quality indicators and modulation and coding schemes according to a parameter of a radio communication terminal apparatus, to determine a modulation and coding scheme of a control channel based on the associations after the switching,
wherein the modulation and coding scheme selection section has an offset table in which the parameter and offset values are associated, and determines the modulation and coding scheme of the control channel based on a channel quality indicator to which all offset values associated with the parameter are added; and
a coding and modulation section that encodes and modulates control data by the modulation and coding scheme determined by the modulation and coding scheme selection section.

2. The radio transmitting apparatus according to claim 1, wherein the modulation and coding scheme selection section has a plurality of channel quality indicator tables and switches between the plurality of channel quality indicator tables according to the parameter, to determine the modulation and coding scheme of the control channel using the switched channel quality indicator tables.

3. The radio transmitting apparatus according to claim 2, wherein the modulation and coding scheme selection section determines the modulation and coding scheme of the control channel based on a new channel quality indicator found by multiplying by a scaling factor the channel quality indicator to which all the offset values associated with the parameter are added.

4. The radio transmitting apparatus according to claim 3, wherein the modulation and coding scheme selection section controls the scaling factor by which the channel quality indicator is multiplied according to magnitude of the channel quality indicator, the channel quality indicator being obtained by adding all offset values associated with the parameter.

5. The radio transmitting apparatus according to claim 1, wherein the modulation and coding scheme selection section uses a transmission bandwidth as a parameter and selects a lower modulation and coding scheme when the transmission bandwidth is narrower.

6. The radio transmitting apparatus according to claim 1, wherein the modulation and coding scheme selection section uses a data channel scheduling method as a parameter and selects a higher modulation and coding scheme in persistent scheduling.

7. The radio transmitting apparatus according to claim 1, wherein the modulation and coding scheme selection section uses a number of data channel retransmissions as a parameter and selects a lower modulation and coding scheme when the number of retransmissions increases.

8. The radio transmitting apparatus according to claim 1, wherein, upon determining a modulation and coding scheme of a data channel, the modulation and coding scheme selection section does not switch the associations between channel quality indicators and modulation and coding schemes according to the parameter.

9. A radio transmitting apparatus comprising:
a modulation and coding scheme selection section that switches associations between channel quality indicators and modulation and coding schemes according to a parameter of a radio communication terminal apparatus, to determine a modulation and coding scheme of a control channel based on the associations after the switching; and
a coding and modulation section that encodes and modulates control data by the modulation and coding scheme determined by the modulation and coding scheme selection section,
wherein the modulation and coding scheme selection section uses a data channel transmission method as a parameter and selects a lower modulation and coding scheme when frequency hopping is not adopted in a frame and when the transmission bandwidth is narrower.

10. A radio transmission method comprising:
switching associations between channel quality indicators and modulation and coding schemes according to a parameter of radio communication terminal apparatus;
determining a modulation and coding scheme of a control channel based on the associations after the switching,
wherein the determining uses an offset table in which the parameter and offset values are associated, and includes determining the modulation and coding scheme of the control channel based on a channel quality indicator to which all offset values associated with the parameter are added; and encoding and modulating control data by the modulation and coding scheme determined by the determining.

11. The radio transmitting method according to claim 10, wherein the determining uses a plurality of channel quality indicator tables and switches between the plurality of channel quality indicator tables according to the parameter, and includes determining the modulation and coding scheme of the control channel using the switched channel quality indicator tables.

12. The radio transmitting method according to claim 11, wherein the determining is based on a new channel quality indicator found by multiplying by a scaling factor the channel quality indicator to which all the offset values associated with the parameter are added.

13. The radio transmitting method according to claim 12, wherein the determining includes controlling the scaling factor by which the channel quality indicator is multiplied according to magnitude of the channel quality indicator, the channel quality indicator being obtained by adding all offset values associated with the parameter.

14. The radio transmitting method according to claim 10, wherein the determining uses a transmission bandwidth as a parameter and selects a lower modulation and coding scheme when the transmission bandwidth is narrower.

15. The radio transmitting method according to claim 10, wherein the determining uses a data channel scheduling method as a parameter and selects a higher modulation and coding scheme in persistent scheduling.

16. The radio transmitting method according to claim 10, wherein the determining uses a data channel transmission method as a parameter and selects a lower modulation and coding scheme when frequency hopping is not adopted in a frame and when the transmission bandwidth is narrower.

17. The radio transmitting method according to claim 10, wherein the determining uses a number of data channel retransmissions as a parameter and selects a lower modulation and coding scheme when the number of retransmissions increases.

18. The radio transmitting method according to claim 10, wherein, upon determining a modulation and coding scheme of a data channel, the determining does not switch the associations between channel quality indicators and modulation and coding schemes according to the parameter.

* * * * *